US012800981B2

(12) United States Patent
Berenschot et al.

(10) Patent No.: US 12,800,981 B2
(45) Date of Patent: Nov. 17, 2026

(54) LIGHT SOURCE, MEMS OPTICAL SWITCH, SENSOR AND METHODS FOR MANUFACTURING THE SAME

(71) Applicant: Universiteit Twente, Enschede (NL)

(72) Inventors: Johan Willem Berenschot, Enschede (NL); Sonia Maria Garcia Blanco, Enschede (NL); Simen Mikalsen Martinussen, Enschede (NL); Niels Roelof Tas, Enschede (NL); Roald Michel Tiggelaar, Enschede (NL)

(73) Assignee: Universiteit Twente, Enschede (NL)

( * ) Notice: Subject to any disclaimer, the term of this patent is extended or adjusted under 35 U.S.C. 154(b) by 442 days.

(21) Appl. No.: 18/554,597

(22) PCT Filed: Mar. 15, 2022

(86) PCT No.: PCT/NL2022/050140
§ 371 (c)(1),
(2) Date: Oct. 9, 2023

(87) PCT Pub. No.: WO2022/216150
PCT Pub. Date: Oct. 13, 2022

(65) Prior Publication Data
US 2024/0192573 A1 Jun. 13, 2024

(30) Foreign Application Priority Data
Apr. 9, 2021 (NL) ...................................... 2027948

(51) Int. Cl.
*G02F 1/35* (2006.01)
*G02F 1/365* (2006.01)

(52) U.S. Cl.
CPC .......... *G02F 1/3511* (2013.01); *G02F 1/3536* (2013.01); *G02F 1/365* (2013.01); *G02F 2203/56* (2013.01)

(58) Field of Classification Search
CPC ...... G02F 1/3511; G02F 1/3536; G02F 1/365; G02F 2203/56
See application file for complete search history.

(56) References Cited

U.S. PATENT DOCUMENTS 6,834,152 B2 * 12/2004 Gunn, III ............... B82Y 20/00 359/332
6,990,257 B2 * 1/2006 Gunn, III ............... G02B 6/122 385/129

(Continued)

FOREIGN PATENT DOCUMENTS

CN 111864535 10/2020

OTHER PUBLICATIONS

Bai et al., Brillouin-Kerr Soliton Frequency Combs in an Optical Microresonator, Phys. Rev. Lett. 126, 063901—Published Feb. 10, 2021, DOI: https://doi.org/10.1103/PhysRevLett.126.063901 (Year: 2021).*

(Continued)

*Primary Examiner* — Peter Radkowski
(74) *Attorney, Agent, or Firm* — MH2 Technology Law Group, LLP

(57) ABSTRACT

The present invention relates to a light source for generating an optical frequency comb. The present invention further relates to a method for manufacturing the optical resonator used in this light source. The present invention additionally relates to microelectromechanical systems, MEMS, optical switch and system comprising the same. The present invention also relates to a sensor and to a method for manufacturing a suspended silicon nitride structure comprised in the sensor. According to the present invention, a single-step LPCVD deposited monolithic stoichiometric $Si_3N_4$ layer is used on a mono-crystalline aluminum oxide substrate such as sapphire. The thickness of the $Si_3N_4$ layer exceeds 500

(Continued)

nm. This layer can be realized with relatively low residual stress.

20 Claims, 12 Drawing Sheets

(56) References Cited

U.S. PATENT DOCUMENTS 7,145,412 B2 * 12/2006 Hunt .................. G02B 6/12004 333/205
7,184,627 B1 * 2/2007 Gunn, III ............... G02B 6/136 385/27
7,251,386 B1 * 7/2007 Dickinson .............. H04B 10/25 385/24
7,315,662 B2 * 1/2008 Hunt ...................... H10D 86/85 257/E27.113
10,254,481 B2 * 4/2019 Puckett ................. H01S 3/0078
10,268,100 B2 * 4/2019 Sciancalepore ....... G02F 1/3536
10,468,849 B1 * 11/2019 Bradley .................. H01S 3/163
10,651,820 B2 * 5/2020 Kippenberg ........... H03H 9/462
10,884,313 B2 * 1/2021 Gould .................. G02B 6/3508
11,221,540 B2 * 1/2022 Srinivasan ............ G02F 1/3501
11,281,068 B2 * 3/2022 Gould .................. G02B 6/1223
2003/0059190 A1 * 3/2003 Gunn, III ............... G02B 6/132 385/130
2003/0063885 A1 * 4/2003 Gunn, III .............. G02F 1/3133 385/141
2004/0066250 A1 * 4/2004 Hunt ....................... H01P 1/181 333/24 R
2004/0156589 A1 * 8/2004 Gunn, III ........... G02B 6/12004 385/37
2006/0228064 A1 * 10/2006 Hunt ..................... G02F 1/0316 257/E27.113
2018/0083599 A1 * 3/2018 Kippenberg ............ H04J 14/02
2018/0307118 A1 * 10/2018 Sciancalepore ....... G02F 1/3536
2019/0339227 A1 * 11/2019 Drmosh .................. C23C 14/16
2020/0225555 A1 * 7/2020 Gould ................... G02F 1/0018
2021/0055627 A1 * 2/2021 Yu ....................... C23C 14/5806
2021/0080799 A1 * 3/2021 Gould ................... G02F 1/0018
2021/0080805 A1 * 3/2021 Srinivasan ............ G02F 1/3501
2024/0004262 A1 * 1/2024 Yu ....................... C23C 14/5826

OTHER PUBLICATIONS

Briere et al., Rotating Circular Micro-Platform with Integrated Waveguides and Latching Arm for Reconfigurable Integrated Optics. Micromachines 2017, 8, 354. https://doi.org/10.3390/mi8120354 (Year: 2017).*

Roeloffzen et al., Low-Loss Si3N4 TriPleX Optical Waveguides: Technology and Applications Overview, in IEEE Journal of Selected Topics in Quantum Electronics, vol. 24, No. 4, pp. 1-21, Jul.-Aug. 2018, Art No. 4400321, doi: 10.1109/JSTQE.2018.2793945. (Year: 2018).*

Seok et al., Large-scale broadband digital silicon photonic switches with vertical adiabatic couplers, Optica 3, 64-70 (2016) (Year: 2016).*

Sorace-Agaskar et al., Versatile Silicon Nitride and Alumina Integrated Photonic Platforms for the Ultraviolet to Short-Wave Infrared, in IEEE Journal of Selected Topics in Quantum Electronics, vol. 25, No. 5, pp. 1-15, Sep.-Oct. 2019, Art No. 8201515, doi: 10.1109/JSTQE.2019.2904443. (Year: 2019).*

Frigg, Optical frequency comb generation with low temperature reactive sputtered silicon nitride waveguides, APL Photonics, Jan. 22, 2020, vol. 5, No. 1, American Institute of Physics, Melville, NY.

Chao, Novel patterned sapphire substrates for enhancing the efficiency of GaN-based light-emitting diodes, RSC Advances, Apr. 24, 2020, p. 16284-16290, vol. 10, No. 28.

Tian, An unreleased MEMS actuated silicon nitride resonator with bidirectional tuning, 2018 Conference on Lasers and Electro-Optics, p. 1-2, May 13, 2018, OSA.

Mu, Monolithic Integration of A12O3 and Si3N4 Toward Double-Layer Active-Passive Platform, IEEE Journal of Selected Topics in Quantum Electronics, Sep. 1, 2019, p. 1-11, vol. 25, No. 5, IEEE, USA.

Su, High-Q factor Al 2 O 3 micro-trench cavities integrated with silicon nitride waveguides on silicon, Optics Express, Apr. 30, 2018, p. 11161, vol. 26, No. 9.

* cited by examiner

LIGHT SOURCE, MEMS OPTICAL SWITCH, SENSOR AND METHODS FOR MANUFACTURING THE SAME

The present invention relates to a light source for generating an optical frequency comb. The present invention further relates to a method for manufacturing the optical resonator used in this light source. The present invention additionally relates to microelectromechanical systems, MEMS, optical switch and system comprising the same. The present invention also relates to a sensor and to a method for manufacturing a suspended silicon nitride structure comprised in the sensor.

Light sources for generating an optical frequency comb known in the art comprise an optical resonator and a laser source. The optical resonator comprises a substrate on which a closed-loop waveguide is either directly or indirectly deposited. The closed-loop waveguide is optically coupled to an input waveguide and an output waveguide, which are equally arranged on the substrate. The laser source is configured for transmitting a beam of coherent light into the input waveguide.

Optical resonators of the type described above are among the most common and versatile building blocks in integrated non-linear optical circuits. The fundamental design consists of a waveguide looped back on itself, and which is optically coupled to an input and output waveguide of the resonator. The closed-loop waveguide forms an optical cavity. The shape and size of the cavity define one or more resonant frequencies and corresponding resonant wavelengths. If light is received by the resonator that has this resonant frequency/wavelength, it will circulate through this cavity thereby accumulating optical energy inside the cavity. This accumulation of optical energy is exploited to allow the use of low-power laser sources, specifically pump laser sources, for phenomena that normally need high intensities, such as generating an optical frequency comb.

Optical resonators may be used to generate frequency combs as they allow for four-wave mixing, FWM. Four-wave mixing is a process occurring in a non-linear optical medium by which two photons are annihilated and two new photons are created. FIG. 9A illustrates degenerate FWM, where the two annihilated photons are of identical energy, whereas FIG. 9B shows non-degenerate FWM with photons of unequal energy. Because FWM is subject to conservation of energy without loss to the material, the energy splitting needs to be symmetric in both cases. The modes will be approximately equally spaced in a resonator with low integrated dispersion, as shown in FIG. 9C. When FWM occurs in an optical cavity as the earlier discussed closed-loop waveguide, FWM will fill most of, or all of the cavity modes in the wavelength range experiencing anomalous dispersion, creating a frequency comb.

A well known non-linear effect occurring inside optical materials is the Kerr effect, also called the quadratic electro-optic effect. This effect corresponds to a change in the refractive index of the optical material in response to an applied electric field. In optical resonators, the applied electric field originates from the light itself. Consequently, when sufficient optical energy is inside the optical resonator, the optical material will behave in a non-linear manner, for example due to the Kerr effect or other non-linear effects, and a frequency comb will be generated in correspondence with the abovementioned four-wave mixing process. When the frequency comb is generated mainly due to the occurrence of the Kerr effect, the frequency comb is referred to as a Kerr frequency comb.

Well known light sources that are used to generate optical frequency combs use silicon nitride waveguides deposited on a silicon substrate, and, more specifically, deposited on a silicon oxide cladding present in between the waveguide and the silicon substrate. Such sources are generally suitable for generating optical frequency combs in the near infrared spectrum, or, alternatively, between approximately 800 nm and 2500 nm. The combination of a silicon nitride waveguide deposited on silicon oxide is considered very suitable for this application because of the large refractive index contrast between the two materials enabling sufficient optical confinement of the light within the silicon nitride. However, generating optical frequency combs in a lower frequency spectrum has not yet been achieved.

It is an object of the application to provide a more versatile light source for generating an optical frequency comb over a larger frequency range. It is a further object to provide a light source for generating an optical frequency comb at larger wavelengths. More specifically, it is an object to provide a light source that can generate an optical frequency comb for wavelengths in the visible light spectrum, which ranges from approximately 380 nm up to approximately 800 nm wavelength, the near-infra red spectrum, which ranges from approximately 800 nm up to approximately 2500 nm wavelength, as well as wavelengths in the fundamental infra-red spectrum, which ranges from 2500 nm up to 5000 nm wavelength. This should be achieved without jeopardizing optical performance of the optical resonator.

The present invention achieves these objects by providing a light source for generating an optical frequency comb as defined in claim 1. This light source comprises an optical resonator. The optical resonator comprises a mono-crystalline aluminum oxide substrate, an input waveguide, an output waveguide, and a closed-loop waveguide. The closed-loop waveguide is arranged on the substrate, and is optically coupled to the input waveguide and output waveguide. The closed-loop waveguide is configured for receiving at least a part of a beam of light from the input waveguide, for accumulating optical energy inside the closed-loop waveguide using the received beam of light, for generating an optical frequency comb using the accumulated optical energy, for example using the four-wave mixing process, and for coupling at least a part of the generated optical frequency comb to the output waveguide. The closed-loop waveguide is a monolithic silicon nitride waveguide having a thickness of 500 nm or more, and which is deposited on the substrate.

The Applicant realized that a silicon nitride waveguide deposited on a silicon oxide cladding cannot reliably guide light having a wavelength of more than approximately 3 um. This can be attributed to the high absorption of optical energy inside the cladding for these wavelengths.

Additionally, the Applicant realized that non-linear optical phenomena in silicon nitride waveguides on a silicon substrate or a silicon oxide cladding, for example due to the Kerr effect, cannot be reliably achieved at greater wavelengths. Consequently, the FWM process will not or hardly generate a frequency comb at these wavelengths.

In the art, fabricating a silicon nitride layer using a chemical vapor deposition process is considered limited to layers of 400 nm thick at a time. Depositing layers of silicon nitride on silicon and/or silicon oxide cladding thicker than 400 nm was shown to result in waveguides and/or silicon nitride layers prone to cracking. The Applicant realized that this occurs due to high residual stress caused by a large mismatch between the coefficients of thermal expansion of silicon nitride and the underlying silicon substrate. Regardless, to achieve anomalous dispersion or other non-linear optical phenomena at 1550 nm wavelength in a silicon nitride waveguide, the thickness required is already around 700 nm. When the abovementioned anomalous dispersion is required at even greater wavelengths, an even thicker layer of silicon nitride would be required.

A number of methods are known in the art that allow for fabricating a silicon nitride waveguide on silicon having the required thickness. For example, a multi-deposition process can be used in which relatively thin silicon nitride layers are grown after each other, allowing each layer to cool down before a next layer is deposited. A further known method for growing relatively thick silicon nitride layers is the so called damascene process.

Each of the known methods for fabricating a silicon nitride waveguide on silicon or silicon oxide cladding unfortunately results in interfaces inside of the waveguide. Such interfaces are detrimental to the optical performance of a waveguide and introduce losses. Therefore, waveguides fabricated by these methods and having a thickness required for anomalous dispersion at wavelengths greater than 1550 nm, if even possible, will have a relatively large number of internal interfaces and, consequently, diminish optical performance. This problem is in addition to the high absorption of optical energy in the cladding at these relatively long wavelengths.

The object of the present invention is at least partially achieved in the light source according to the present invention. The mono-crystalline aluminum oxide has a lower absorption coefficient than silicon oxide at comparable wavelengths, in particular for wavelengths in the visible spectrum, near IR spectrum, and/or fundamental IR spectrum. However, the Applicant realized that the refractive index contrast between silicon nitride and mono-crystalline aluminum oxide is smaller than the refractive index contrast between silicon nitride and silicon oxide. Therefore, silicon nitride waveguides of a similar size, when deposited on a mono-crystalline aluminum oxide substrate, will show less optical confinement than when deposited on silicon oxide cladding. Consequently, to achieve similar optical confinement, a thicker waveguide is required. This requirement comes on top of the earlier discussed requirement that for anomalous dispersion at greater wavelengths, thicker waveguides are required.

To achieve this, the Applicant has disregarded the belief in the art that the thickness of a monolithic silicon nitride layer is limited to 400 nm. Instead, the Applicant has realized that using a mono-crystalline aluminum oxide substrate, silicon nitride layers can be deposited that show very little residual stress at room temperature. Therefore, when using a mono-crystalline aluminum oxide substrate, relatively thick silicon nitride layers can be deposited with little to no risk of introducing cracking or detachment of the silicon nitride layer. Consequently, monolithic silicon nitride waveguides, when deposited on this substrate, can be reliably fabricated with a thickness at least 500 nm.

It should be noted that within the context of this application, a waveguide or any other body made of the material that such a waveguide can be made of is said to be monolithic when the entire waveguide comprises one continuous region of a particular material. According to the present invention, the monolithic silicon nitride can be made using a single-step low pressure chemical vapor deposition process. This is contrary to the abovementioned multi-deposition processes in which multiple regions of silicon nitride can be identified, for example by interfaces between these regions being visible using electron microscopy. Other processes, like the known damascene process, also do not result in a monolithic silicon nitride layer as interfaces can still be identified inside the material.

The light source may further comprise a laser source for transmitting a beam of light into the input waveguide. Preferably, this laser source is a continuous-wave laser.

The laser source may be configured to generate a light beam at a first frequency. Furthermore, the closed-loop waveguide may be configured to generate the frequency comb to have equidistantly arranged frequency components around the first frequency.

The closed-loop waveguide may be configured to generate a Kerr optical frequency comb.

The silicon nitride waveguide may have a thickness of 750 nm or more, preferably 1 um or more, and more preferably 1.5 um or more. As mentioned earlier, to achieve anomalous dispersion for increasingly greater wavelengths and/or for providing sufficient optical confinement for light having such wavelengths, waveguides of increasing thicknesses are required. As mentioned before, by using the combination of a monolithic silicon nitride layer and a mono-crystalline aluminum oxide such thicknesses are achievable.

The silicon nitride waveguide preferably comprises a $Si_XN_Y$ layer, wherein 0.71<=(X/Y)<=0.76. Stoichiometric silicon nitride may be used for which X=3 and Y=4.

The mono-crystalline aluminum oxide substrate may comprise a sapphire substrate, $\alpha$-$Al_2O_3$, although other crystalline forms of aluminum oxide are not excluded. Instead of being directly deposited onto the substrate, the silicon nitride waveguide may be deposited on an intermediate layer between the silicon nitride waveguide and the substrate. It should be noted that the intermediate layer may have been patterned before depositing the $Si_XN_Y$ layer. A thickness ratio between a thickness of the mono-crystalline aluminum oxide substrate and the intermediate layer preferably exceeds 100:1, and more preferably 1000:1. Such intermediate layers can have a number of useful properties known to the skilled person and the thickness ratio ensures that the intermediate layer has little to no effect on the residual stress build up in the silicon nitride layer after deposition and cooling down.

The closed-loop waveguide, the input waveguide and/or the output waveguide, can all be a ridge waveguides. Using such waveguides is preferred as alternatives commonly require additional processing steps such as patterning of substrates or layers on the substrate, e.g. etching trenches, and fabricating such patterns for this purpose can be complicated and/or costly.

At least one, and preferably all, of the input waveguide and the output waveguide is a silicon nitride waveguide formed during the same process as the silicon nitride waveguide of the closed-loop waveguide. More in particular, the input and output waveguide may have an identical thickness and material composition.

A plethora of configurations is possible for the earlier indicated input and output waveguides. For example, the input waveguide and the output waveguide can be part of a same waveguide. In other embodiments, the input waveguide and the output waveguide are arranged on different and preferably opposite sides of the closed-loop waveguide.

According to another aspect, the present invention provides a method for manufacturing the abovementioned optical resonator. The method comprises the steps of providing a mono-crystalline aluminum oxide substrate, depositing a silicon nitride film of at least 500 nm thick on the substrate in a single-step low-pressure chemical vapor deposition, LPCVD, process at a temperature between 750 and 950° C., providing a masking layer on top of the deposited silicon nitride film, patterning the masking layer, and etching the silicon nitride film using the patterned masking layer to thereby form at least, and preferably all, the closed-loop waveguide among the input waveguide, output waveguide, and closed-loop waveguide.

The Applicant has realized that the abovementioned process is not limited to the manufacturing of optical resonators. Instead, a general silicon nitride structure, such as a waveguide, can be realized on a mono-crystalline aluminum oxide substrate in the manner described above. More in particular, in the abovementioned process only the last step needs to be modified during which the shape of the silicon nitride structure is defined.

The deposited silicon nitride layer may have a thickness of 750 nm or more, preferably 1 um or more, and more preferably 1.5 um or more. Additionally or alternatively, the silicon nitride layer, $Si_XN_Y$, may have a composition in which 0.71<=(X/Y)<=0.76, preferably 0.75, and/or the mono-crystalline aluminum oxide substrate may comprise a sapphire substrate.

The Applicant has found that a monolithic silicon nitride waveguide having a thickness of 500 nm or more can be realized having a surprisingly low stress at room temperatures in any optical circuit element that comprises a mono-crystalline aluminum oxide substrate on which the silicon nitride waveguide is deposited. The Applicant further realized that such a low stress monolithic silicon nitride layer also provides significant advantages in microelectromechanical systems, MEMS.

The present invention therefore also relates to a microelectromechanical system, MEMS, optical switch, as defined in claim 19.

According to the present invention, the optical switch comprises a mono-crystalline aluminum oxide substrate, and a monolithic silicon nitride optical waveguide having a thickness of 500 nm or more that is deposited on the substrate. This optical waveguide comprises a base part that is deposited onto the substrate, preferably directly, and that is configured to receive a beam of light. The optical waveguide further comprises a suspended part having a first end at which the suspended part is integrally connected to the base part and a second end configured to emit said beam of light.

The optical switch further comprises a light reception unit that comprises an optical waveguide, and an actuator configured for displacing the second end relative to the light reception unit in response to an actuation signal to allow or prevent the light beam emitted by the second end to enter the optical waveguide of the light reception unit.

Due to the low stress inside the monolithic silicon nitride when grown on a mono-crystalline aluminum oxide substrate, it becomes possible to realize suspended waveguides or parts thereof which do not present any significant bending. As such, these waveguides can be more reliably used for constructing moveable elements inside a MEMS device, such as the abovementioned suspended part.

The light reception unit may comprise a plurality of optical waveguides, wherein the actuator can be configured to, in response to the actuation signal, select one optical waveguide among the plurality of optical waveguides in which the light beam emitted by the second end is allowed to enter. Accordingly, the present invention allows the realization of a 1×n optical switch having one input and n outputs.

The actuator can be configured to bend the suspended part in response to the actuation signal. In an embodiment, most of the bending occurs at the position at which the suspended part is connected to the base part. Furthermore, the actuator can be configured to bend the suspended part thereby displacing the second end in a direction parallel to the substrate and/or in a direction perpendicular to the substrate. The thickness and width of the silicon nitride waveguide may be chosen in accordance with the desired movement. For example, increasing the thickness of the silicon nitride waveguide would increase the mechanical stiffness with respect to bending in a direction perpendicular to the substrate.

The silicon nitride optical waveguide may be configured to guide light at a wavelength between 400 nm and 5500 nm. Additionally or alternatively, the silicon nitride waveguide may have a thickness of at least 750 nm, more preferably at least 1 um, and even more preferably at least 1.5 um. The silicon nitride waveguide may be a ridge waveguide of which the corresponding silicon nitride layer, $Si_XN_Y$, has a composition in which 0.71<=(X/Y)<=0.76, more preferably X=3 and Y=4, the latter composition corresponding to stoichiometric silicon nitride.

Each optical waveguide of the light reception unit may comprise a receiving silicon nitride optical waveguide that was formed during the same process as the silicon nitride optical waveguide. More in particular, the composition and thicknesses of these waveguides can be identical.

The suspended part may comprise a first part at least partially extending away from the substrate between the first end and a third end, wherein the first end is integrally connected to the base part. The suspended part may further comprise a second part extending substantially parallel to the substrate between a fourth end and the second end, wherein the fourth end is integrally connected to the third end.

The actuator can be an electrostatic actuator comprising a non-suspended electrode that is fixedly connected to the substrate and a suspended electrode. Here, a spacing between the suspended electrode and the non-suspended electrode can be changed by applying an electrical actuation signal to the electrodes. Furthermore, the suspended electrode is mechanically coupled to the suspended part such that movement between the non-suspended and suspended electrodes is transferred into a movement of the suspended part.

The suspended electrode and the non-suspended electrode can each be formed using one or more conductive layers, such as one or more metal layers. The one or more conductive layers of the suspended electrode can be formed on the suspended part. In this case, the optical switch may further comprise a cladding layer arranged in between the silicon nitride optical waveguide of the suspended part and the one or more conductive layer(s) of the suspended electrode. Alternatively, the optical switch may comprise a supporting beam that mechanically couples the suspended electrode to the suspended part.

The optical switch may further comprise suspended springs having one end fixedly connected to the substrate and another end to the suspended electrode. Additionally or alternatively, the springs and/or supporting beam can each be formed using the same silicon nitride layer as the silicon nitride layer used for forming the silicon nitride optical waveguide. More in particular, the thickness and composition of these layers can be identical.

According to a further aspect, the present invention further provides a system comprising the MEMs optical switch as described above, and a laser source configured to generate a laser beam and mutually arranged with the MEMs optical switch such that the generated beam enters the base part of the silicon nitride waveguide.

According to a further aspect, the present invention further provides a sensor. According to the present invention, the sensor comprises a mono-crystalline aluminum oxide substrate, a sensing member comprising a suspended silicon nitride structure having at least one end fixedly connected to the substrate, and a sensing unit for sensing a bending of the sensing member. The suspended silicon nitride structure is realized using the deposition of a monolithic silicon nitride film on the substrate, wherein the silicon nitride film has a thickness of 500 nm or more. Preferably, the mono-crystalline aluminum oxide substrate comprises a sapphire substrate.

The sensor may further comprise a capturing agent or coating layer for capturing specific particles and/or molecules of at least 100 Dalton, such as particular proteins, DNA, ionic compounds, bacteria, or virii. For example, the sensor may be configured to detect the presence of virus particles or bacteria. More in particular, if the virus particles or bacteria adhere to the coating layer thereby increasing the weight of the sensing member, the sensing member will bend. Such bending can subsequently be detected by the sensing unit, thereby demonstrating the presence of the virus particles or bacteria.

The sensor may further comprise a first body and a second body spaced apart from the first body, wherein the first and second body are each made of a sacrificial layer. Here, a sacrificial layer is a layer that has been etched away, at least for a large part, for allowing upper lying structures to become suspended, for example suspended in air. In addition, a suspended structure is not supported in a direction towards the substrate by a layer. Such structure can be fixedly attached at one point to the substrate, for example with cantilevers, or can be fixedly attached to the substrate at multiple points.

The sensing member may comprise a first and second base part arranged on the first and second body, respectively. The suspended part may extend between the first and second base parts.

Only a segment of the first and second base parts can be arranged on the first and second bodies, respectively. A remaining segment of the first and second base parts can be arranged directly on the substrate.

Alternatively, the sensor may comprise one of a recess in or a through hole through the substrate arranged underneath the suspended silicon nitride structure.

The suspended silicon nitride structure can be one of a straight or curved beam or waveguide, a spiral structure, or a membrane.

The sensor may further comprise an input waveguide arranged on the substrate and extending between a first end and a dividing end, and an output waveguide arranged on the substrate and extending between a combining end and a second end. The sensor may further include a reference waveguide arranged on the substrate and having one end thereof connected, preferably integrally, to the dividing end of the input waveguide and an other end thereof connected, preferably integrally, to the combining end of the output waveguide. In this case the sensing member may comprise a first waveguide segment arranged on the substrate and having one end thereof connected, preferably integrally, to the dividing end of the input waveguide and an other end thereof connected, preferably integrally, to an end of the suspended silicon nitride structure. The sensing member may additionally comprise a second waveguide segment arranged on the substrate and having one end thereof connected, preferably integrally, to the combining end of the output waveguide and an other end thereof connected, preferably integrally, to an opposing end of the suspended silicon nitride structure. Here, the suspended silicon nitride structure comprises a silicon nitride waveguide.

The first waveguide segment, the second waveguide segment, the input waveguide, and the output waveguide, can all be made using a same silicon nitride layer as the suspended silicon nitride structure. Additionally or alternatively, the first waveguide segment may correspond to the first base part and the second waveguide segment to the second base part.

The sensor may further comprise a light source, such as a laser source, for emitting a beam of light into the first end of the input waveguide, and a light intensity measuring unit for measuring an intensity of light outputted at the second end of the output waveguide. In this type of sensor, light passing through the reference waveguide interferes with light passing through the sensing member. Bending of the sensing member will change its effective refractive index. This will in turn change the interference between the light passing through the sensing member and reference waveguide. Such change can be detected using for example the light intensity measuring unit or some other means for detecting changes in light interference.

The sensing member can be configured to display a change in electrical characteristics in dependence of a bending of the sensing member. Furthermore, the sensing unit may comprise a processing unit configured for measuring the electrical characteristics of the sensing member. For example, the sensing member may comprise a strain gauge. In this manner, the sensor can be configured as an accelerometer.

The suspended silicon nitride structure can be made from a silicon nitride layer having a thickness of 750 nm or more, preferably 1 um or more, and more preferably 1.5 um or more. Furthermore, the silicon nitride layer, $Si_XN_Y$, may have a composition in which $0.71<=(X/Y)<=0.76$, more preferably 0.75.

According to a further aspect, the present invention provides a method for manufacturing a suspended silicon nitride structure. According to the present invention, this method comprises the steps of providing a mono-crystalline aluminum oxide substrate, and depositing a sacrificial layer on the substrate, wherein the sacrificial layer comprising sacrificial material. The method comprises the additional steps of providing a first masking layer on top of the deposited sacrificial layer, patterning the first masking layer, and etching the sacrificial layer using the patterned first masking layer to thereby form a body of said sacrificial material.

The method comprises the additional steps of depositing a monolithic silicon nitride film of at least 500 nm thick on the substrate and body of sacrificial material in a single-step low-pressure chemical vapor deposition, LPCVD, step at a temperature between 750 and 950° C., providing a second masking layer on top of the deposited silicon nitride film, patterning the second masking layer, and etching the silicon nitride film using the patterned second masking layer to thereby form the silicon nitride structure. As a final step, the body of sacrificial material is etched to thereby allow the silicon nitride structure to be suspended.

The deposited silicon nitride layer may have a thickness of 750 nm or more, preferably 1 um or more, and more preferably 1.5 um or more. Additionally or alternatively, the silicon nitride layer, $Si_XN_Y$, may have a composition in which 0.71<=(X/Y)<=0.76, more preferably 0.75, and/or the mono-crystalline aluminum oxide substrate comprises a sapphire substrate.

Next, the present invention will be described in more detail by referring to the appended drawings, wherein.

Figure 10B:
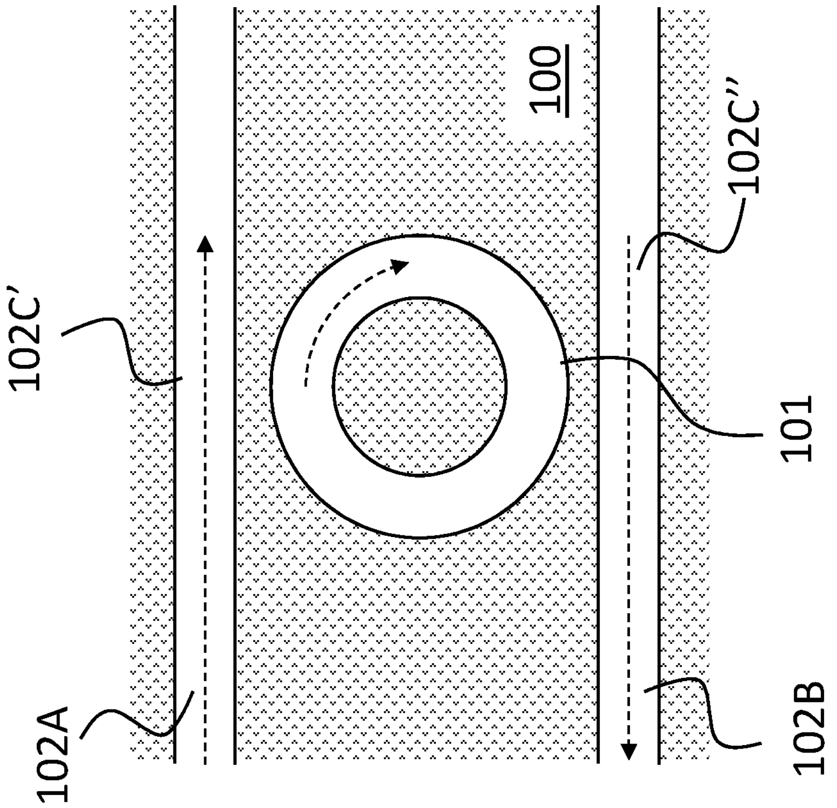
Figure 10A:
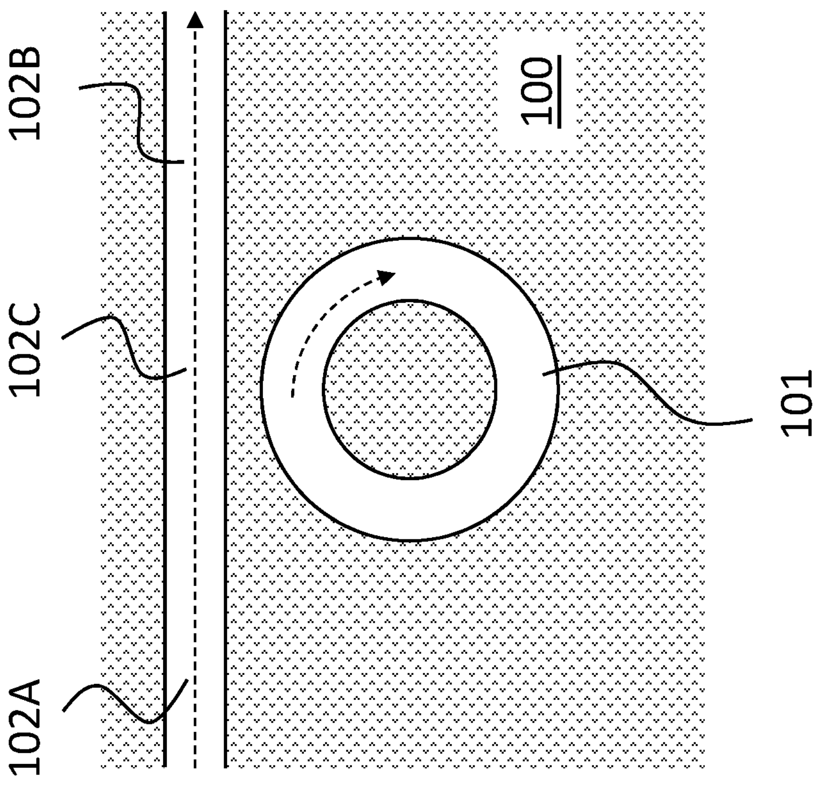
Figure 10C:
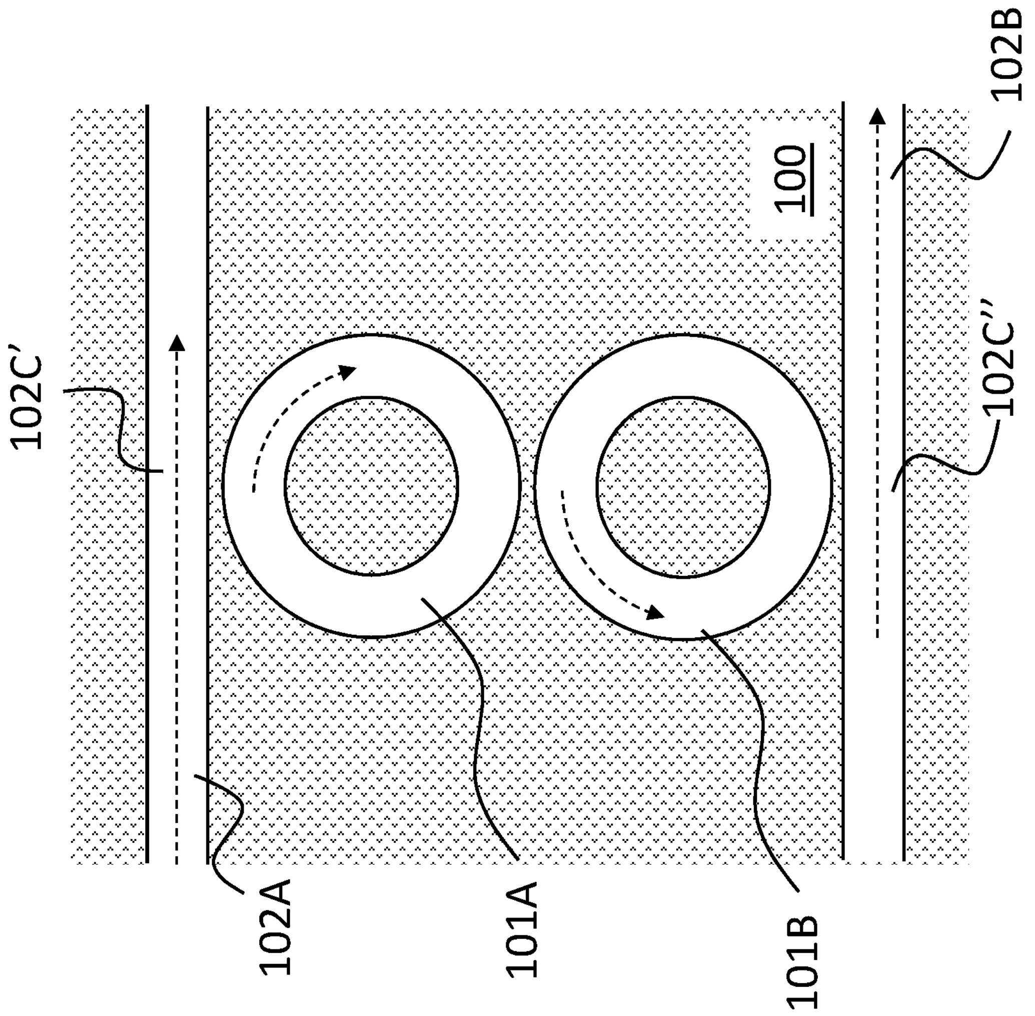
Figure 11:
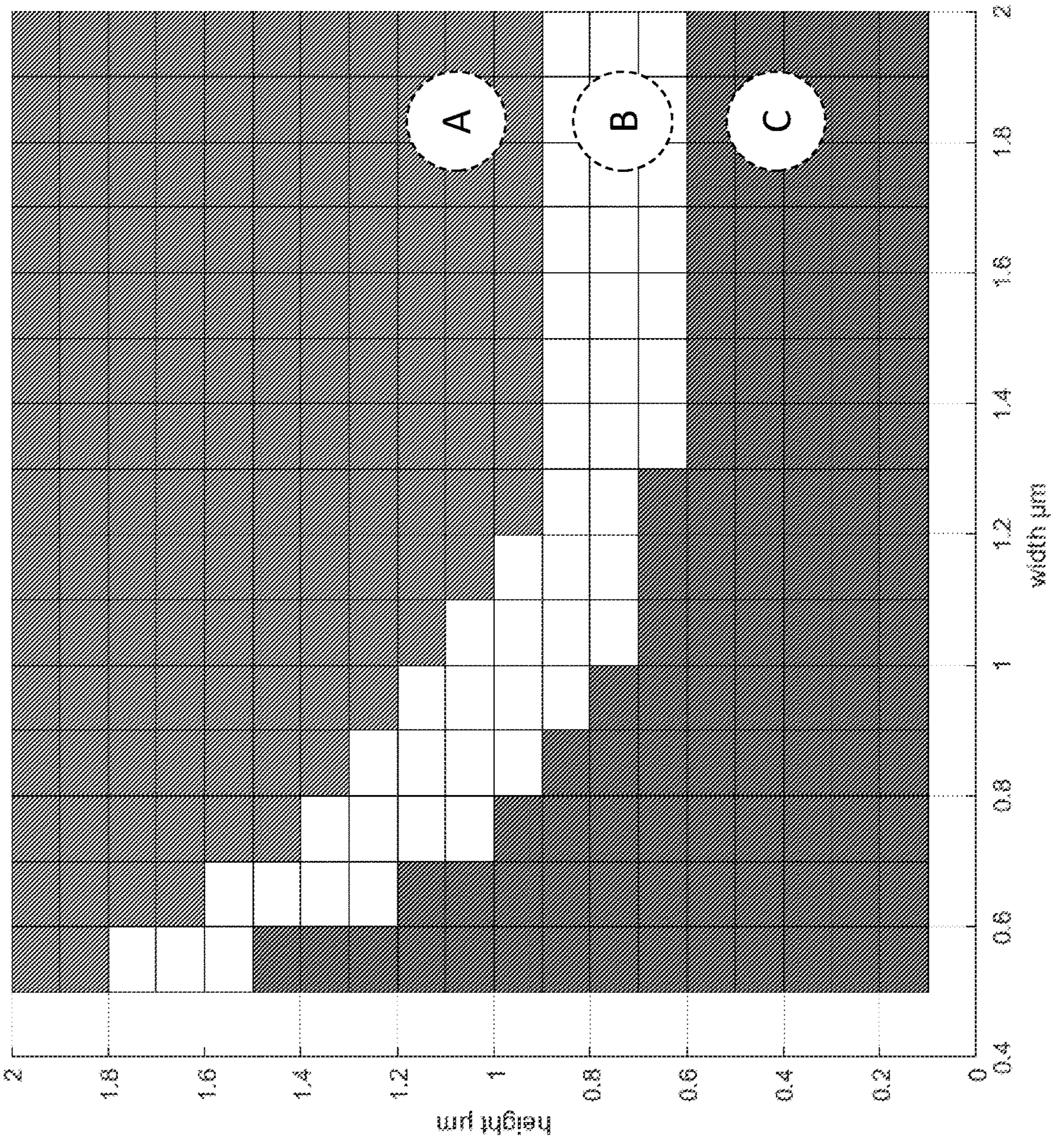

FIGS. 9A-C show spectra generated by four-wave mixing;

FIGS. 10A-C show top down views of possible configurations of optical resonators; and FIG. 11 shows a graph indicating transmission and types of dispersion of light in a waveguide.

Figure 1:
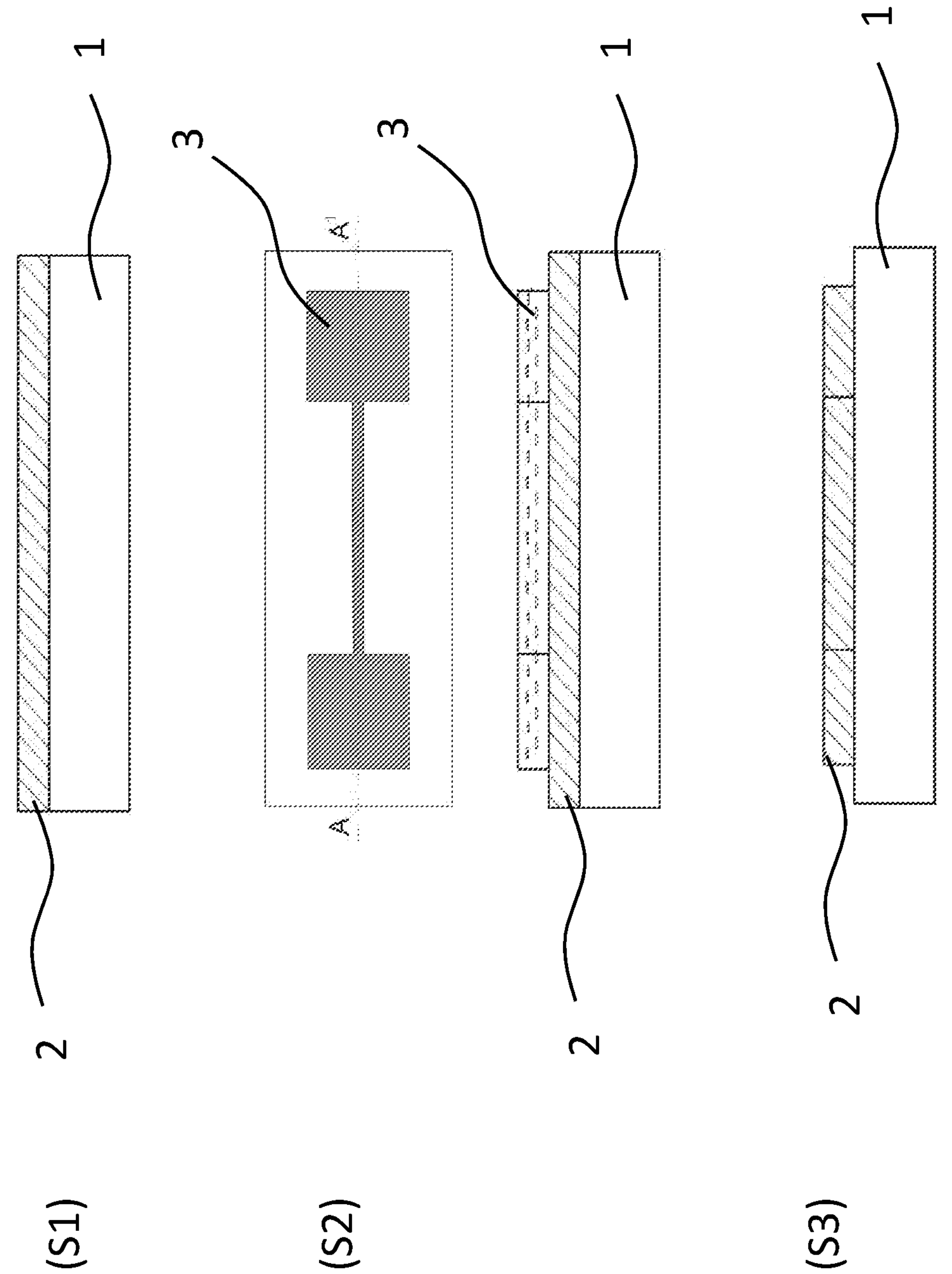
FIG. 1 illustrates a method for realizing $Si_3N_4$ microstructures on sapphire in accordance with the present invention.

FIG. 1 illustrates a method for realizing $Si_3N_4$ microstructures on sapphire in accordance with the present invention. In this method, as a first step, a sapphire substrate 1 is provided that is cleaned using $HNO_3$, ozone-steam, or a Piranha solution, i.e. a mixture of sulfuric acid $H_2SO_4$, water, and hydrogen peroxide $H_2O_2$. Additionally or alternatively, an RCA cleaning step can be performed.

As a next step S1, a single-step low-pressure chemical vapor deposition, LPCVD, process is used to deposit a stoichiometric $Si_3N_4$ layer 2 on sapphire substrate 1. Typically, $NH_3$ and $SiH_2Cl_2$ are used as precursors in a flow ratio of 3:1, and a deposition temperature between 750 and 950° C., preferably between 800 and 850° C., and more preferably around 825° C., is used at a pressure of around 200 mTorr. Thicknesses of $Si_3N_4$ layer 2 can be in the range between 10 nanometer and 10 micrometer, and are preferably in excess of 750 nm.

Instead of stoichiometric silicon nitride, a silicon nitride layer $Si_XN_Y$ may be deposited that has a composition in which 0.71<=(X/Y)<=0.76.

As a further step, a photoresist layer 3 is applied onto the deposited $Si_3N_4$ layer 2. As a next step S2, photolithography techniques are used to define patterns in photoresist layer 3. This is shown in top view and cross-sectional view in FIG. 1. Next, in step S3, the pattern in photoresist 3 is transferred into $Si_3N_4$ layer 2 by means of plasma etching, for example using reactive ion etching using a $CHF_3/O_2$ plasma. As a next step, photoresist layer 3 is removed.

Figure 2:
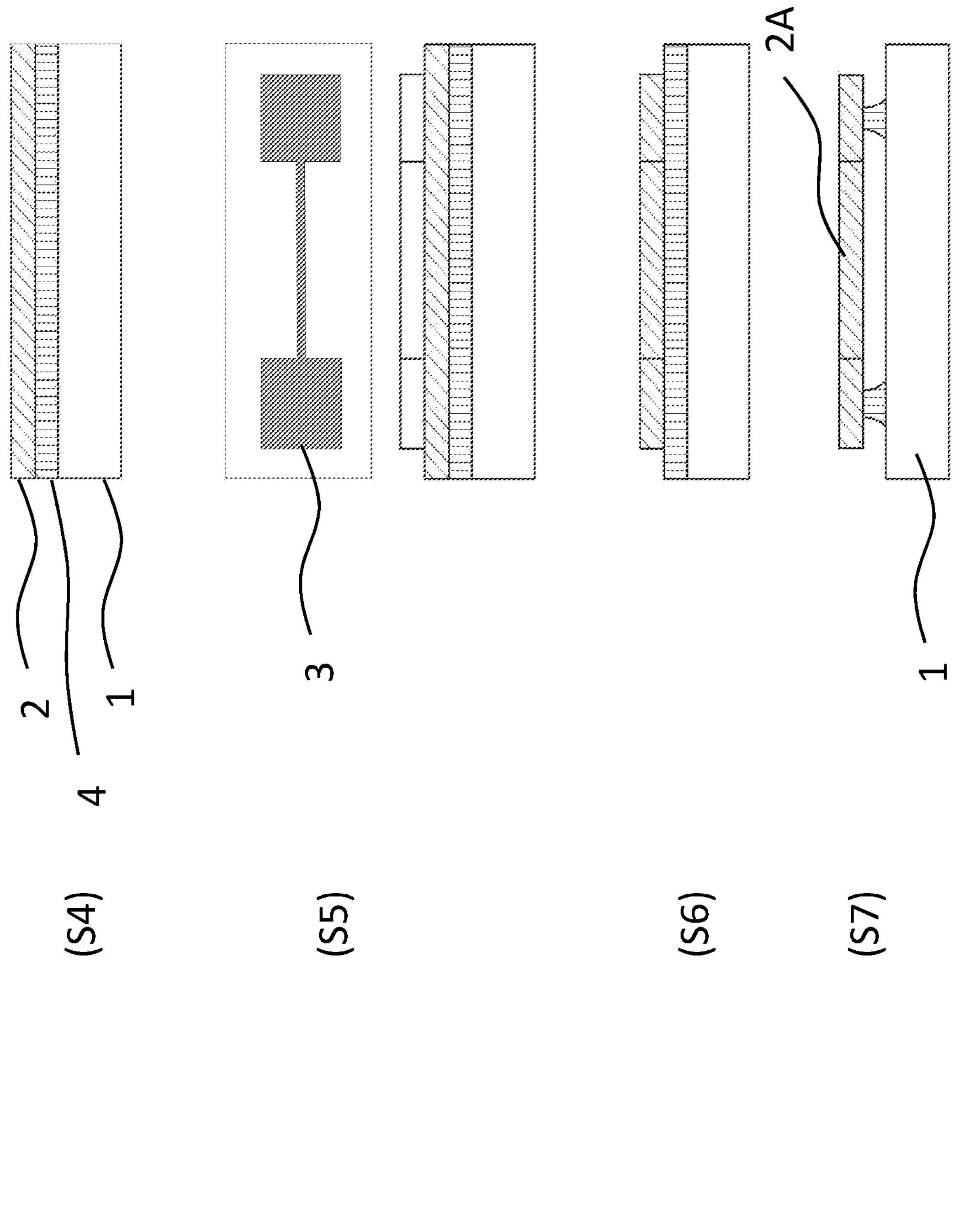
FIG. 2 illustrates a first method for realizing suspended $Si_3N_4$ microstructures on sapphire in accordance with the present invention.

FIG. 2 illustrates a first method for realizing suspended $Si_3N_4$ microstructures on sapphire in accordance with the present invention. Compared to FIG. 1, the process of FIG. 2 differs in that suspended $Si_3N_4$ microstructures are formed.

The first step of this method is identical to that of FIG. 1. A sapphire substrate 1 is provided and cleaned. As a next step, a single-step LPCVD process is used to deposit an amorphous silicon layer 4 using $SiH_4$ as a precursor. The thickness of this layer can be in the range between 10 nm and 10 um. After this deposition, a cleaning step may be used that is identical or similar to the cleaning step used for cleaning sapphire substrate 1.

As a next step S4, a stoichiometric $Si_3N_4$ layer 2 is deposited on sapphire substrate 1 using the LPCVD process of FIG. 1. Furthermore, similar to FIG. 1, a photoresist layer 3 is applied and patterned in step S5, and the pattern is transferred into $Si_3N_4$ layer 2 in step S6.

The method continues, in step S7, by etching the amorphous silicon underneath $Si_3N_4$ layer 2 at predefined positions on substrate 1. In this respect, the amorphous silicon acts as a sacrificial layer. This etching is typically performed using a wet-chemical etching step through the created openings in $Si_3N_4$ layer 2, for example using Tetramethylammonium hydroxide, TMAH. This etching step causes an underetch that should be accounted for when designing the mask layers to be used during the lithography step. Furthermore, the composition of $Si_3N_4$ layer 2 may be non-stoichiometric as explained in connection with FIG. 1.

As shown in FIG. 2, final figure, $Si_3N_4$ layer 2 comprises a suspended part 2A that is spaced apart from sapphire substrate 1.

Figure 3:
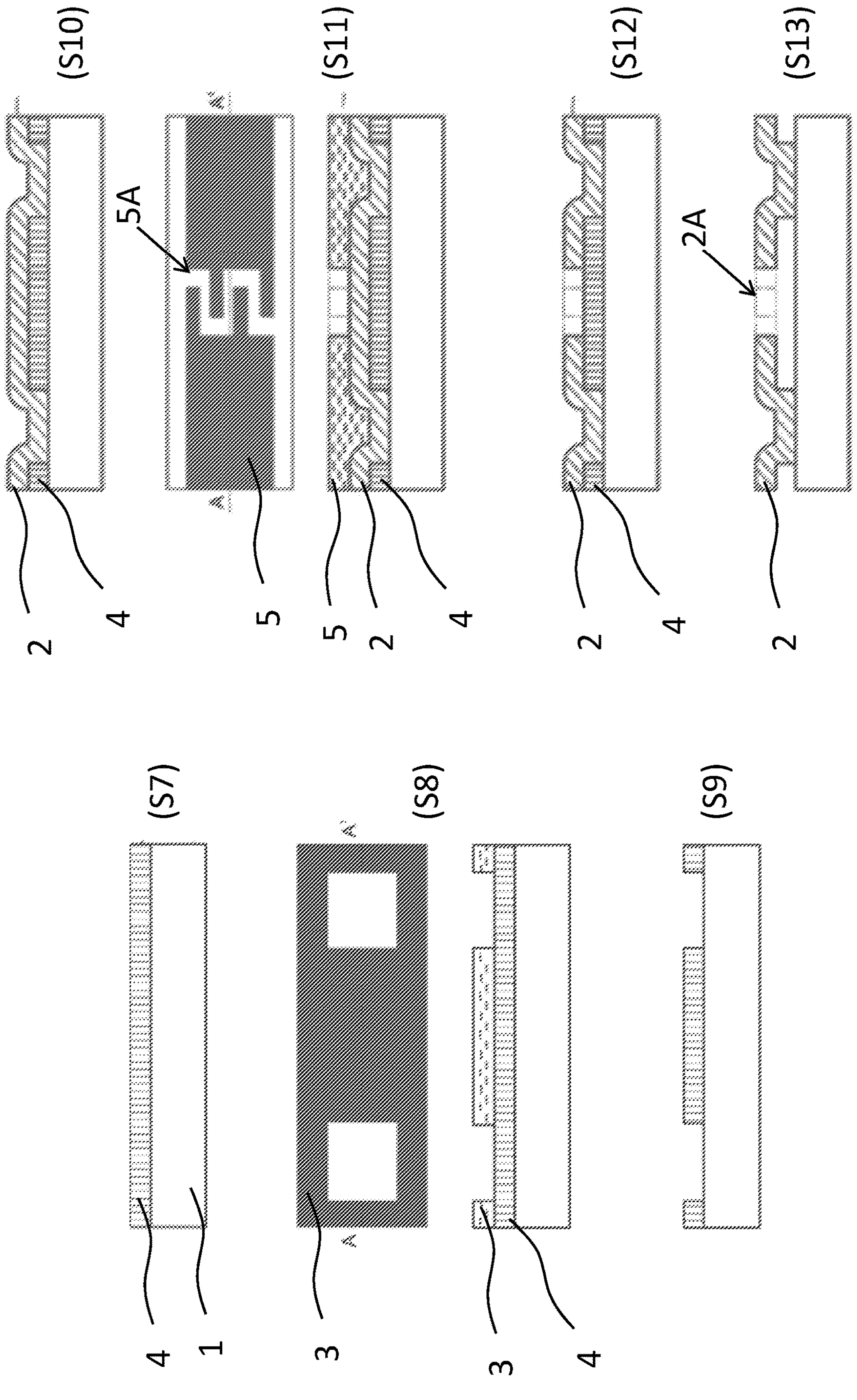
FIG. 3 illustrates a second method for realizing suspended $Si_3N_4$ microstructures on sapphire in accordance with the present invention.

FIG. 3 illustrates a second method for realizing suspended $Si_3N_4$ microstructures on sapphire in accordance with the present invention. As a first step, a sapphire substrate 1 is provided and cleaned similar to that in FIG. 1. As a next step S7, an amorphous silicon layer 4 is deposited onto sapphire substrate 1 using a similar or identical process as explained in connection with FIG. 2. In step S8, a photoresist layer 3 is applied and patterned. The pattern in transferred in step S9 into amorphous silicon layer 4 using plasma etching, such as reactive ion etching using an $SF_6/CHF_3/O_2$ plasma. Subsequently in step S9, photoresist layer 3 is removed and a cleaning step is performed similar or identical to the cleaning step for cleaning substrate 1. After having performed step S9, small bodies of amorphous silicon layer 4 remain on substrate 1.

Next, in step S10 a single-step LPCVD process is used for depositing a $Si_3N_4$ layer 2 similar or identical to the deposition process in FIGS. 1 and 2. Next, in step S11 a further photoresist layer 5 is applied and patterned. More in particular, a pattern 5A is formed for realizing a meandering $Si_3N_4$ track. Other shapes would be equally possible. This pattern is transferred in step S12 into $Si_3N_4$ by means of plasma etching step similar or identical to the etching step in FIGS. 1 and 2. After etching, further photoresist layer 3 is removed in step S12.

As a next step S13, amorphous silicon layer 4 is removed by means of wet and dry etching. First, a wet-chemical etching step is performed using a wet-chemical etching process using TMAH as illustrated in FIG. 2. This process is continued until the $Si_3N_4$ structures are nearly suspended or released. Thereafter, a dry-etching step, such as gas phase etching, is performed using $XeF_2$ to obtain fully suspended $Si_3N_4$ structures.

Figure 4:
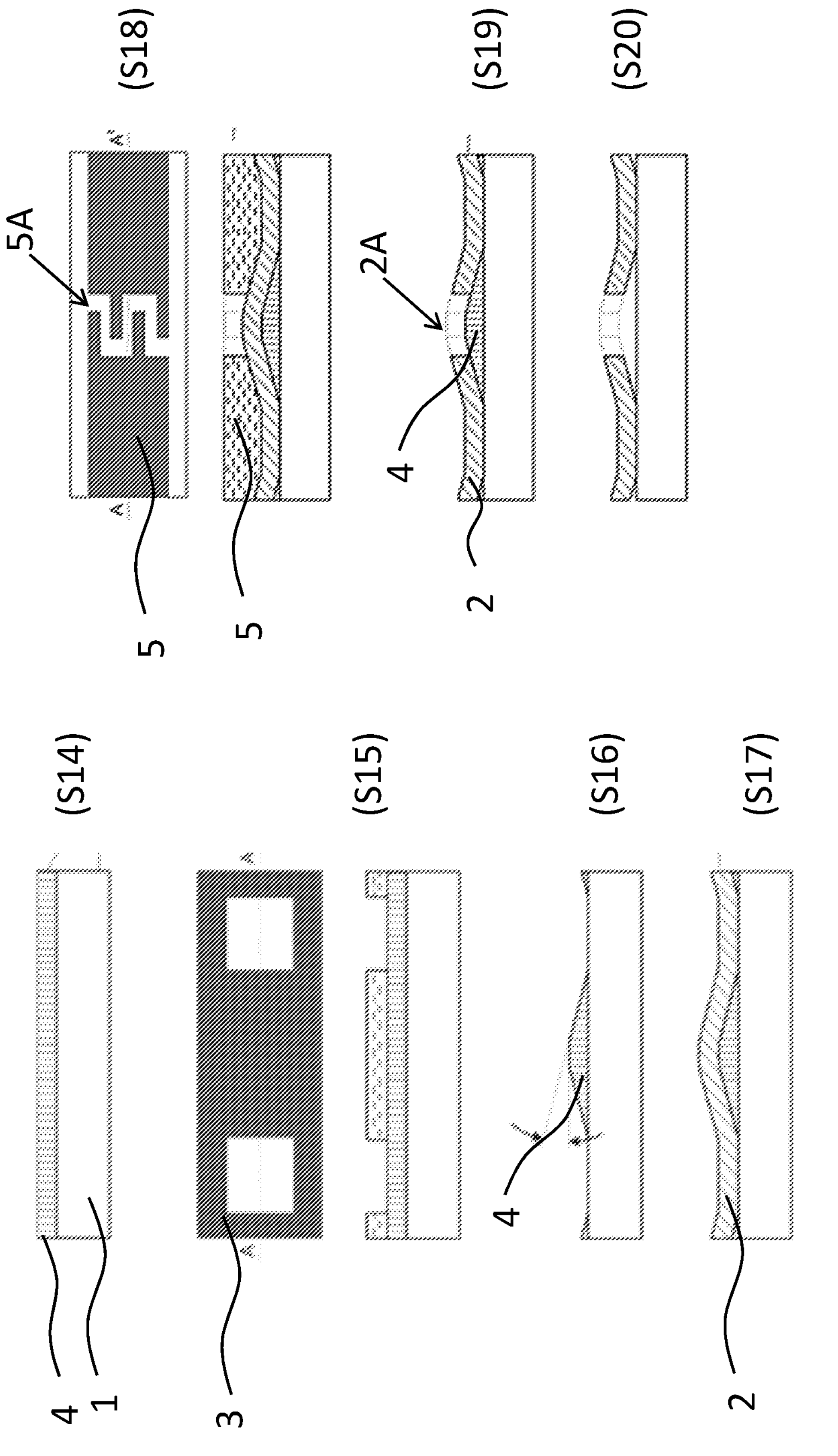
FIG. 4 illustrates a third method for realizing suspended $Si_3N_4$ microstructures on sapphire in accordance with the present invention.

FIG. 4 illustrates a third method for realizing suspended $Si_3N_4$ microstructures on sapphire in accordance with the present invention. As a first step, a sapphire substrate 1 is provided that is cleaned similar or identical to that shown in FIG. 1. As a next step S14, a single-step LPCVD deposition process is performed for depositing an amorphous silicon layer 4 similar or identical to that of FIG. 2. In addition, a $SiO_2$ layer and a $Si_3N_4$ layer are deposited in the order mentioned (not shown). These layers are then covered with a photoresist layer 3 that is patterned in step S15. The pattern in photoresist layer 3 is transferred into the $Si_3N_4$ layer using a dry-etching technique after which photoresist layer 3 is removed. Thereafter, a localized oxidation of silicon, LOCOS, process is applied to locally oxidize amorphous silicon layer 4 through the $SiO_2$ layer. Due to the presence of the $SiO_2$ layer, oxygen will laterally diffuse causing a vertical tapering in the oxidized amorphous silicon layer. After oxidation, one or more selective etching steps will be performed in step S16 for removing the $Si_3N_4$ layer, and the deposited and formed $SiO_2$ thereby leaving the remaining amorphous silicon layer 4. After this step, a tapered amorphous silicon layer 4 is obtained that tapers in the vertical direction.

As a next step, a cleaning step will be performed similar or identical to the step of cleaning substrate 1 in FIG. 1. Then, in step S17, a single-step LPCVD deposition process is performed for depositing a $Si_3N_4$ layer similar or identical to that of FIG. 1. In step S18, a further photoresist layer 5 is deposited and patterned for forming a meandering structure 5A similar or identical to that of FIG. 3. This pattern is transferred into $Si_3N_4$ layer 2 in step S19 using a plasma etching step similar or identical to that of FIG. 3 and photoresist layer 5 is removed. As a next step S20, amorphous silicon layer 4 is removed using a combination of wet and dry etching steps similar or identical to that of FIG. 3.

In FIGS. 1-4 above, an optional cladding layer (not shown) can be deposited onto the formed $Si_3N_4$ layer. Such cladding layer may for example comprise a $SiO_2$ layer that is deposited using a single-step LPCVD process using a tetraethyl orthosilicate, TEOS, precursor. The thickness of such layer may be in the order of 1 um. Furthermore, the cladding layer may be subjected to an annealing step at 1100° C. for 1-3 hours in an $N_2$-environment. A cladding layer may also be deposited using atomic layer deposition or sputtering of $Al_2O_3$. Compared to $SiO_2$, $Al_2O_3$ has the advantage of being transparent in the mid-infrared spectral range.

In addition, instead of amorphous silicon, sacrificial layers of different sacrificial material can be used.

Furthermore, if needed, sapphire substrate 1 can be diced into individual dies after completing the above and optionally other processing steps.

Figure 5:
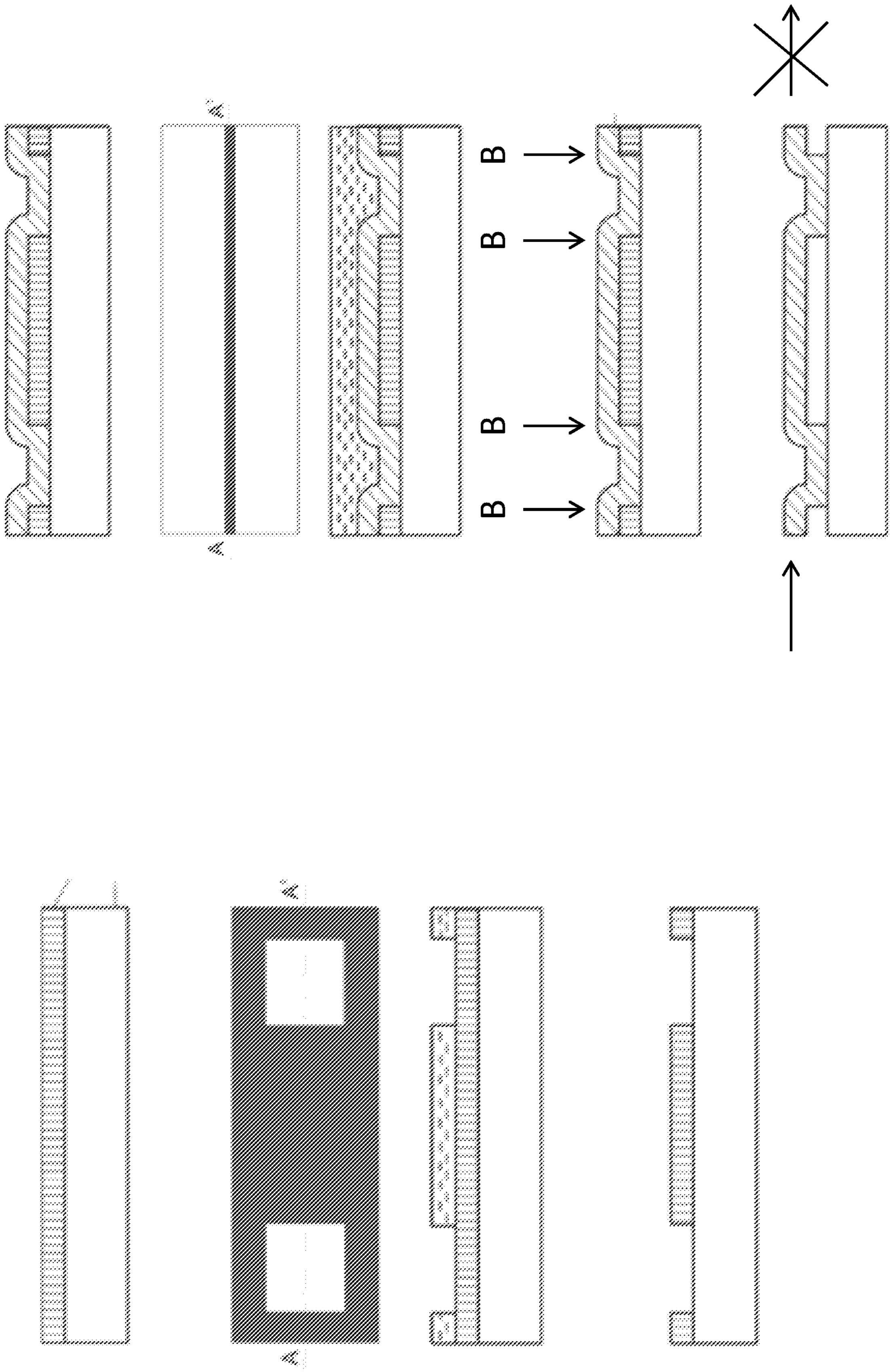
FIG. 5 illustrates a fourth method for realizing suspended $Si_3N_4$ waveguides on sapphire in accordance with the present invention.
Figure 6:
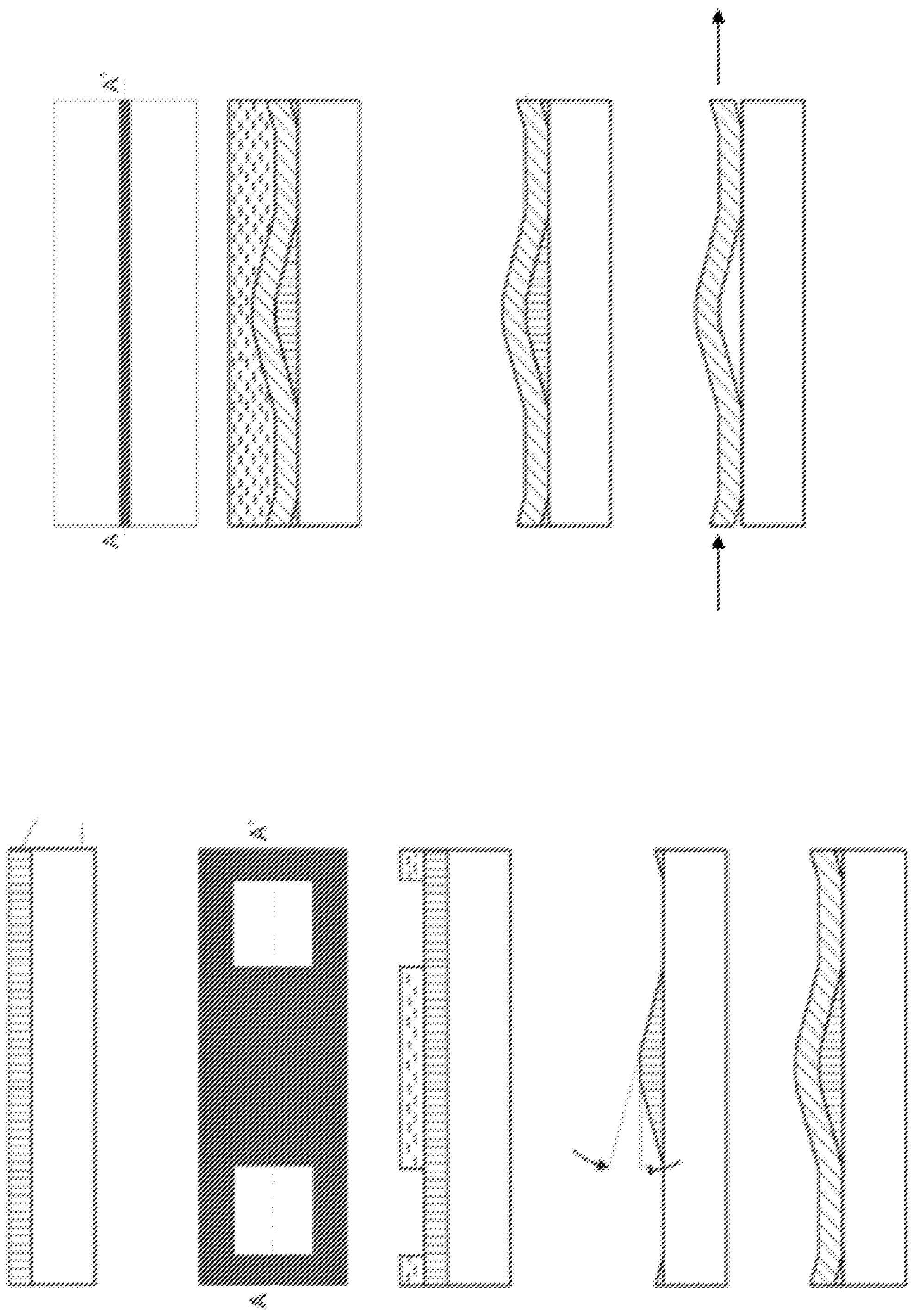
FIG. 6 illustrates a fifth method for realizing suspended $Si_3N_4$ waveguides on sapphire in accordance with the present invention.

FIGS. 5 and 6 illustrate a fourth and fifth method for realizing suspended $Si_3N_4$ microstructures on sapphire in accordance with the present invention. Here, FIG. 5 corresponds to the process depicted in FIG. 3 and FIG. 6 to that shown in FIG. 4. More in particularly, FIGS. 5 and 6 illustrate the consequences of depositing a $Si_3N_4$ waveguide over a sacrificial layer for the transmission of an optical signal indicated by the arrows. As shown in FIG. 5, due to the strong vertical boundaries in amorphous silicon layer 4 at the positions indicated by B, little to no light will be outputted in FIG. 5. On the other hand, due to the vertical tapering in FIG. 6, most if not all of the inputted light will be outputted.

It should be noted that the tapering illustrated in FIGS. 4 and 6 is not true to scale. More in particular, a typical tapering would be in the range between 1 and 50 nm vertical offset per um in the horizontal direction.

Figure 7:
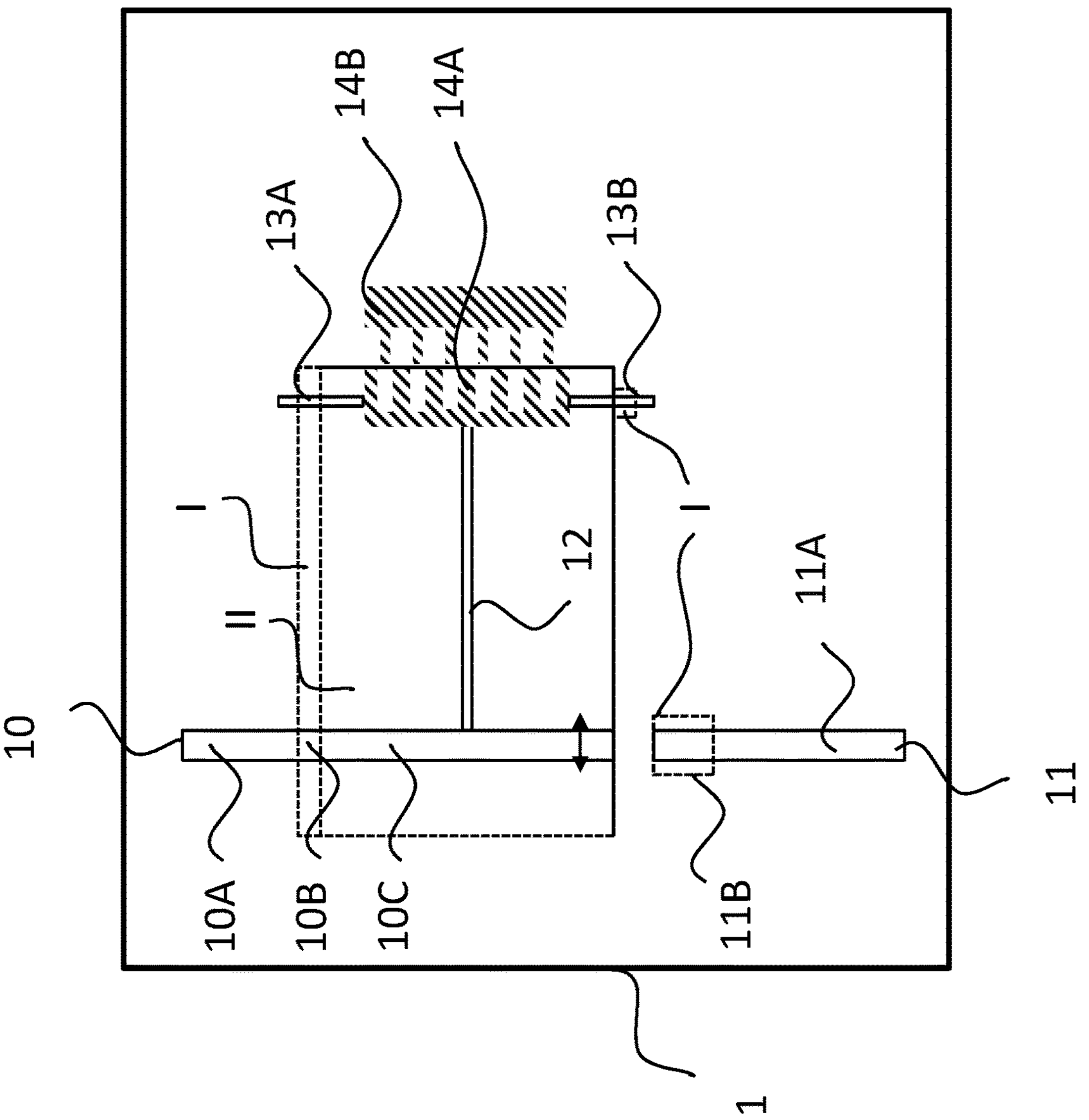
FIG. 7 illustrates an embodiment of an optical switch in accordance with the present invention.

FIG. 7 illustrates an embodiment of an optical switch in accordance with the present invention.

As shown, the optical switch comprises a sapphire substrate 1. On sapphire substrate 1, a sacrificial $SiO_2$ layer has been deposited, which has been patterned and selectively removed. In region II, this sacrificial layer is completely removed, whereas regions I indicate a transitional region in which the sacrificial layer has a vertical tapering as discussed in connection with FIG. 6.

The optical switch comprises an input $Si_3N_4$ ridge waveguide 10 which outside of regions I and II has a part 10A that is directly formed on sapphire substrate 1. Inside region I, waveguide 10 has a part 10B that is gradually lifted away from substrate 1 by an increasingly thicker sacrificial layer. Inside region II, the sacrificial layer has been etched away. Consequently, waveguide 10 comprises a suspended part 10C.

An output waveguide 11 is arranged opposite to waveguide 10, albeit at a given horizontal clearance. The end facets of waveguides 10 and 11 are shaped to allow a proper optical coupling provided that waveguides 10, 11 are aligned.

Similar to input waveguide 10, output waveguide 11 comprises a part 11A that is directly contacting sapphire substrate 1 and a part 11B that gradually moves away from sapphire substrate 1 to bring the ends of parts 11B and 10B in vertical alignment.

Suspended part 10C is fixedly connected to a support beam 12 that is formed of a suspended $Si_3N_4$ beam. On another end, support beam 12 is connected to a suspended electrode 14A. This electrode comprises a $Si_3N_4$ base on which an electrode metal layer has been deposited. On opposite sides, suspended electrode 14A is connected to sapphire substrate 1 using $Si_3N_4$ springs 13A, 13B, which have, similar to input waveguide 10, a part that is directly connected to sapphire substrate 1, a part that is gradually lifted away from substrate 1 by the sacrificial layer, and a part that is suspended above substrate 1.

Non-suspended electrode 14B comprises a $Si_3N_4$ base that is arranged on the sacrificial layer, which in turn is deposited on sapphire substrate 1. On top of the $Si_3N_4$ base, an electrode metal layer has been deposited.

By applying a voltage between electrodes 14A, 14B, these electrodes can either be pulled together or be pushed apart. The applied voltage thereby forms an actuation signal in dependence of which suspended part 10C performs a lateral movement as indicated by the arrow. In this manner, the optical coupling between input waveguide 10 and output waveguide 11 can be established or broken.

By arranging a plurality of output waveguides adjacent to one another, a 1×n switch can be realized. More in particular, an optical coupling between the input waveguide and one among the n output waveguides can be established in dependence of the actuation signal.

A possible drawback of using a support beam 12 as illustrated in FIG. 7 is related to optical loss at the point at which support beam 12 is connected to suspended part 10C. To address this issue, it is possible to provide a clearance between $Si_3N_4$ support beam 12 and suspended part 10C and to fill this clearance with a cladding layer, such as a $SiO_2$ layer. In this manner, a cladding layer or a material suitable to be used as a cladding layer is used to connect suspended part 10C and support beam 12.

In even other embodiments, suspended electrode 14A is formed directly on, below or to the side of suspended part 10C. To prevent optical losses, a cladding layer such as a $SiO_2$ layer can be provided in between suspended part 10C and the metal layer of electrode 14A.

Figure 8:
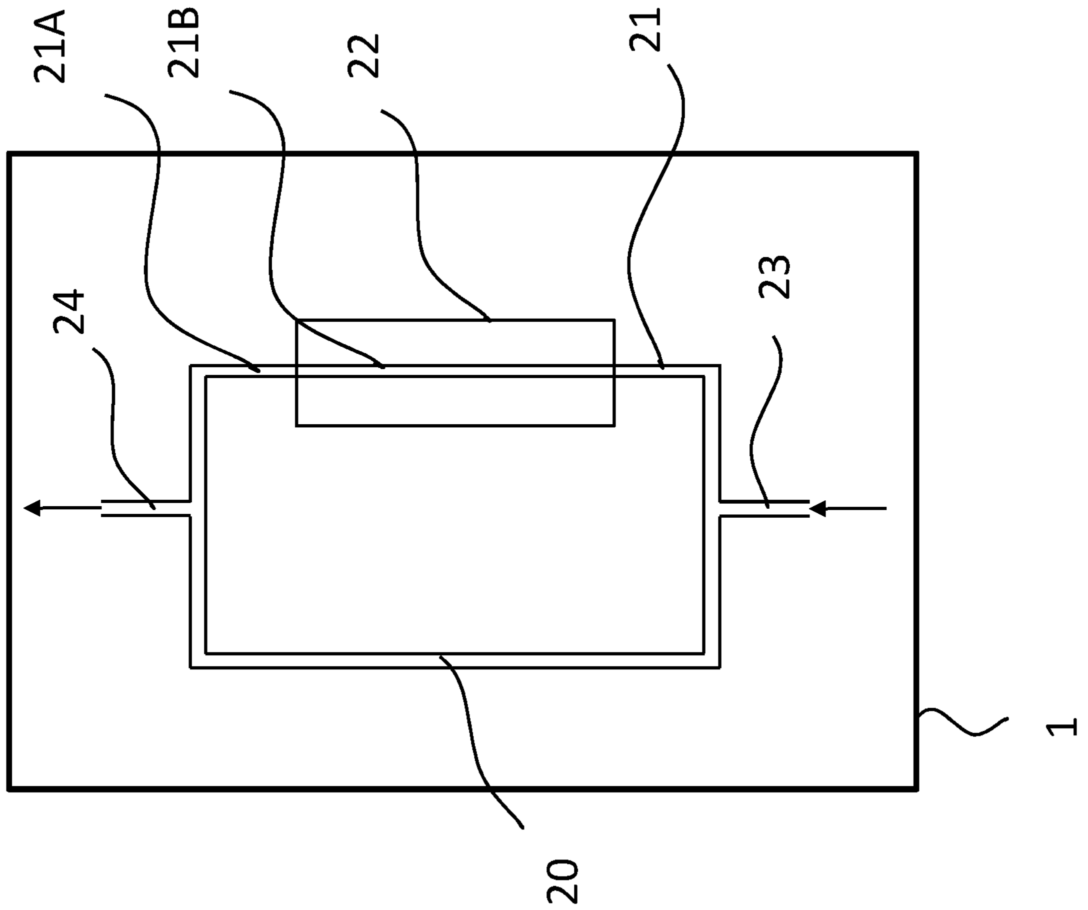
FIG. 8 illustrates an embodiment of a sensor in accordance with the present invention.

FIG. 8 illustrates an embodiment of a general sensor in accordance with the present invention. This sensor comprises a reference arm 20 comprising a $Si_3N_4$ waveguide on a sapphire substrate 1 and a sensing arm 21 also comprising a $Si_3N_4$ waveguide on a sapphire substrate 1.

Sensing arm 21 comprises a part 21A that is directly arranged on sapphire substrate 1 and a part 21B that is suspended above sapphire substrate 1 by using a sacrificial layer that has been etched away inside region 22. A tapering (not shown) may be used to provide a transition between parts 21A and 21B.

Light inputted into input $Si_3N_4$ waveguide 23 is split, preferably equally, over reference arm 20 and sensing arm 21. At output $Si_3N_4$ waveguide 24, the light from these arms is combined and fed to a light intensity meter (not shown).

Suspended part 21B of sensing arm 21 may deform. For example, suspended part 21B may bend towards or away from substrate 1. Alternatively or additionally, suspended part 21B may bend in a direction parallel to sapphire substrate 1.

Regardless the direction of movement, most if not any deformation of suspended part 21B will change the effective refractive index of suspended part 21B. Consequently, the effective optical path length through sensing arm 21 will change whereas the optical path length through reference arm 20 will essentially remain constant.

In some embodiments, particularly but not necessarily those in which suspended part 21B has a more complex shape than shown, such as a spiral, reference arm 20 can also comprise a suspended part similar to the one described in relation to sensing arm 21 and/or sensing window 22 can extend to both arms of the sensor. This places the reference arm in a more similar environment and therefore allows for it to provide a better reference.

At output waveguide 24, light from both arms 20, 21 will interfere. Depending on the relative phase offset, the interference can be constructive or destructive. This difference can be determined using the light intensity meter that is connected to output waveguide 24.

The sensor of FIG. 8 can be used to determine bending of suspended part 21B by looking at the measured light intensity value and comparing this value to a known reference value or a previously determined value, preferably a value representative for a state of sensing arm 21 in which the arm was not bent. More in particular, by comparing these values, the amount of bending can be determined or estimated.

The bending of sensing arm 21B can be caused by various factors depending on the type of sensor. For example, at least suspended part 21B may be provided with a capturing agent or coating layer for capturing specific species, particles, molecules, pathogens, or the like. Once these species, particles, molecules or pathogens adhere to suspended part 21B, this part may bend as a result of the accumulated weight. In this manner, the sensor can be used as a detector for detecting the presence and/or quantity of adhered particles. In some embodiments, the capturing agent can also be applied onto reference arm 20. In addition, in some embodiments in which the capturing agent is only applied to sensing arm 21, reference arm 20 may also have a suspended part similar to sensing arm 21.

Suspended part 21B may also bend as a result of an acceleration of the sensor as such. It is therefore possible to use the sensor of FIG. 8 as an accelerometer. Alternatively, suspended part 21B may also bend as a result of a collision with an ultrasonic wave. It is therefore possible to use the sensor of FIG. 8 as an ultrasound sensor.

In FIG. 8, a sacrificial layer was used for allowing part 21B to suspend above substrate 1. Alternatively, suspended part 21B can be realized by arranging a recess in or through hole through substrate 1. Such through hole is etched from the backside of sapphire substrate 1 using a suitable wet-etchant such as a $H_2SO_4$—$H_3PO_4$ mixture and a suitable mask layer such as $SiO_2$ deposited on the back side. Such etchant should preferably not or hardly etch suspended part 21B once it reaches the front side of sapphire substrate 1. When using wet-etchants for realizing through holes, C-plane oriented sapphire is preferably used. An advantage of using a through hole is that the sensor could be placed inside a stream of particles to be detected without completely blocking the particles inside this stream.

Sensing arm 21 is depicted as a straight waveguide. Other shapes, such as suspended membranes, suspended interdigitated structures, and suspended spirals are not excluded.

Although the sensor depicted in FIG. 8 is an optical application, the present invention is not limited thereto. For example, instead of relying on interference to detect bending of sensing arm 21, non-optical means could be employed such as a strain gauge or other electrical means. In such case, reference arm 20 may be omitted.

Figure 9:
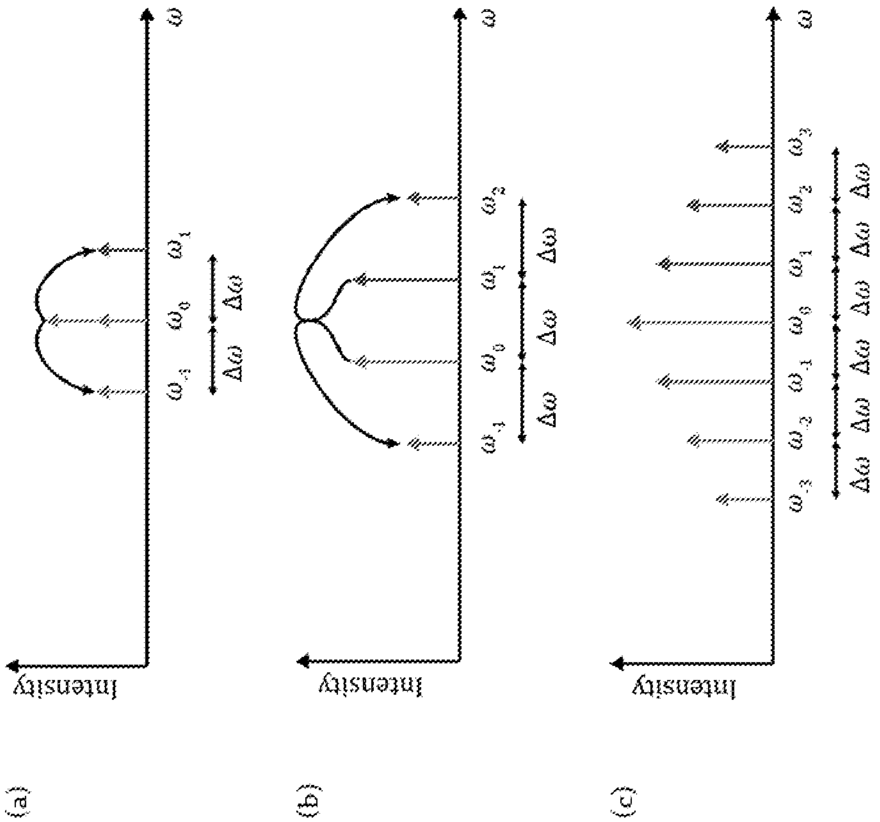

Next, an application of monolithic silicon nitride on sapphire substrates for non-linear optical applications will be described in more detail by referring to FIGS. 9-11.

Optical resonators using closed-loop waveguides rely on four-wave mixing to generate the optical frequency comb. FWM is the non-linear optical process by which two photons are annihilated and two new photons are created in a non-linear optical material, as illustrated in FIGS. 9A and 9B. Specifically, FIG. 9B shows degenerate FWM, where the two annihilated photons are of identical energy ($w_0$), whereas FIG. 9B shows non-degenerate FWM, where the two annihilated photons are of unequal energy ($w_0$, $w_1$). The difference in frequency between the original photons and the photons newly generated ($D_w$) corresponds to the distance between adjacent resonator modes, or an integer times this distance.

Because FWM is subject to conservation of energy without loss to the material, the energy splitting needs to be symmetric in both cases. The modes will be approximately equally spaced in a resonator with low integrated dispersion, as shown in FIG. 9C. In this case, FWM will fill all the cavity modes, creating a frequency comb. The dynamics of comb formation are highly complex, and involve both degenerate and non-degenerate FWM of modes that are not necessarily adjacent.

FIGS. 10A-C each show an optical resonator that could be part of a light source according to the present invention. Specifically, each of these figures show an input waveguide 102A having a coupling section 102C; 102C', an output waveguide 102B also having a coupling section 102C; 102C", as well as at least one closed-loop waveguide 101; 101A, 101B. The coupling sections of the input and/or output waveguide each optically couple the respective waveguide with the closed-loop waveguide.

Closed-loop waveguide 101 in the embodiments shown is a ring resonator or, what is also referred to as a ring cavity. However, waveguide 101 can also take on other shapes such as that of a racetrack waveguide. A racetrack waveguide is a type of closed-loop waveguide comprising a plurality of semi-circular sections and a plurality of linear sections integrally connected in a manner such that the waveguide as a whole loops back on itself.

The closed-loop waveguide is a stand-alone structure which interacts with its surroundings by optical coupling. This can be achieved in a number of ways, such as directing a laser onto the waveguide directly, via free space or via a fiber directly connected to the waveguide. Such coupling can be enabled by providing waveguide 101 with a prism for in-coupling said laser, or by providing waveguide 101 with coupling gratings. In the embodiments shown, optical coupling is enabled by arranging the coupling sections 102C; 102C', 102C" adjacent to closed-loop waveguide 101. When arranged sufficiently close to each other, the coupling sections and the parts of the closed-loop waveguide adjacent thereto together form a directional coupler. Therefore light will jump from coupling sections 102C; 102C', 102C" to closed-loop waveguide 101 and vice-versa.

Closed-loop waveguide 101 is a silicon nitride waveguide deposited onto a mono-crystalline aluminum oxide substrate 100, which preferably comprises a sapphire substrate. Input waveguide 102A and output waveguide 102B can also be fabricated on this material and are preferably ridge type waveguides. However it is also possible for these waveguides to be made of other materials. Closed-loop waveguide 101 has a thickness of 500 nanometer or more. The top down views shown should not be interpreted as providing insight to the height of any of the waveguides. While the other waveguides are preferably as thick as closed-loop waveguide 101, these can also have thicknesses different from that of closed-loop waveguide 101, as well as different from each other. Likewise, widths and lengths of waveguides, as well as distances between them, as shown in FIGS. 10A-C, are not true to scale.

FIG. 10A shows a specific embodiment in which input waveguide 102A, coupling section 102C, and an output waveguide 102B are all integrally connected and are collectively embodiment by a singular linear waveguide. Further embodiments are possible in which the input waveguide and/or the output waveguide are bent and/or curved. The direction in which light travels though the in linear waveguide dictates the direction in which light coupled to the closed-loop waveguide will travel in said closed loop waveguide. Similarly, the direction in which light travels in the closed-loop waveguide dictates the direction in which light coupled to the output waveguide will travel in said output waveguide. In this particular embodiment, light travels from left to right in input waveguide 102A and consequently will travel from left to right in the part of closed-loop waveguide adjacent to the coupling section of input waveguide. In closed-loop waveguide 101, light travels clockwise. In this embodiment the coupling sections of the input and output waveguides are embodied by the same piece of waveguide. Light will therefore also travel from left to right in the coupling section of the output waveguide.

FIG. 10B shows a specific embodiment in which input waveguide 102A and output waveguide 102B are arranged on different sides, specifically opposite sides, of the closed-loop waveguide 101. In this particular embodiment, light travels from left to right in input waveguide 102A and consequently will travel from left to right in the part of closed-loop waveguide adjacent to the coupling section of input waveguide. In closed-loop waveguide 101, light travels clockwise. Some light will leak through the directional coupler formed by the closed loop waveguide and the coupling section of the input waveguide. In this embodiment the coupling sections of the input and output waveguides are embodied by different pieces of waveguide. Because the coupling section 102C" of the output waveguide 102B is adjacent to a part of the closed-loop waveguide in which light travels from right to left, light coupled from that part of the closed loop waveguide that is coupled into the output waveguide will also travel from right to left. Consequently, light will be emitted from the optical resonator in the same direction as it was received.

In some embodiments, not shown, input waveguide 102A extends beyond coupling section 102C' and loops back to integrally connect to the coupling section 102C" of the output waveguide 102B. Such an embodiment allows for any input light that leaks beyond coupling section 102C' to be part of the ultimately emitted beam of light while in-coupling and out-coupling behavior of the closed-loop waveguide can be configured separately. In some embodiments, not shown, the coupling sections 102C' and 102C" can be sufficiently long for multiple closed loop waveguides to be arranged in between them, and wherein each of the plurality of closed loop waveguides are optically coupled to the input waveguide and the output waveguide and not optically coupled to one another.

FIG. 10C shows a specific embodiment in which two adjacently arranged closed-loop waveguides 101A, 101B are optically coupled to each other. The loop dimensions need not be identical. However, when the loop dimension are identical, a steeper filter effect can be obtained. Similar to the FIG. 10B embodiment, input waveguide 102A and output waveguide 102B are arranged on different sides, specifically opposite sides, of the closed-loop waveguide 101A, 101B.

In this particular embodiment, light is coupled between the closed-loop waveguides 101A, 101B by the same directional coupling mechanism as described earlier. Consequently, whereas light travels clockwise in closed-loop waveguide 101A, it travels counterclockwise in closed loop waveguide 101B.

FIG. 11 shows types of dispersion that can occurs for light having a wavelength of 1550 nm in a silicon nitride waveguide. Specifically, the horizontal X-axis shows a number of possible widths that such a waveguide can have, in particular between 0.5 and 2 micrometer. The vertical Y-axis shows a number of possible heights that such a waveguide can have, in particular between 0.1 and 2 micrometer. In waveguides of which the width/height combination puts said waveguide in area C, light of this wavelength is not guided at all. In waveguides of which the width/height combination puts said waveguide in area B, light of this wavelength will experience normal dispersion. In waveguides of which the width/height combination puts said waveguide in area A, light of this wavelength will experience anomalous dispersion. As can be seen, a waveguide with a thickness of approximately 900 nm is required for light having a wavelength of 1550 nm to experience anomalous dispersion at all, which shows the earlier assertion that relatively thick silicon nitride waveguides are required to achieve anomalous dispersion for wavelengths in the infra-red spectrum. In the above, the present invention has been explained using detailed embodiments thereof. However, it should be apparent to the skilled person that various modifications are possible to these embodiments without deviating from the scope of the present invention, which is defined by the appended claims and their equivalents.

The invention claimed is:

1. A light source for generating an optical frequency comb, comprising:
- an optical resonator, comprising:
  - a mono-crystalline aluminum oxide substrate;
  - an input waveguide;
  - an output waveguide; and
  - a closed-loop waveguide arranged on the substrate, and optically coupled to the input waveguide and output waveguide, wherein the closed-loop waveguide is configured for:
    - receiving at least a part of a beam of light from the input waveguide;
    - accumulating optical energy inside the closed-loop waveguide using the received beam of light;

generating an optical frequency comb using the accumulated optical energy; and coupling at least a part of the generated optical frequency comb to the output waveguide;

wherein the closed-loop waveguide is a monolithic silicon nitride waveguide having a thickness of 500 nm or more, and which is deposited on the substrate.

2. The light source according to claim 1, further comprising a laser source for transmitting a beam of light into the input waveguide.

3. The light source according to claim 2, wherein the laser source is a continuous-wave laser.

4. The light source according to claim 2, wherein laser source is configured to generate a light beam at a first frequency, and wherein the closed-loop waveguide is configured to generate said frequency comb to have equidistantly arranged frequency components around the first frequency.

5. The light source according to claim 1, wherein the closed-loop waveguide is configured to generate a Kerr optical frequency comb.

6. The light source according to claim 1, wherein the silicon nitride waveguide has a thickness of 750 nm or more.

7. The light source according to claim 1, wherein the silicon nitride waveguide comprises a $Si_XN_Y$ layer, wherein 0.71<=(X/Y)<–0.76.

8. The light source according to claim 1, wherein the mono-crystalline aluminum oxide substrate comprises a sapphire substrate.

9. The light source according to claim 1, wherein the monolithic silicon nitride waveguide is deposited directly on the mono-crystalline aluminum oxide substrate.

10. The light source according to claim 1, wherein the monolithic silicon nitride waveguide is deposited on the mono-crystalline aluminum oxide substrate via an intermediate layer, wherein a thickness ratio between a thickness of the mono-crystalline aluminum oxide substrate and the intermediate layer exceeds 100:1.

11. The light source according to claim 1, wherein the closed-loop waveguide, the input waveguide and/or the output waveguide, is a ridge waveguide.

12. The light source according to claim 1, wherein at least one of the input waveguide and the output waveguide is a silicon nitride waveguide formed during the same process as the silicon nitride waveguide of the closed-loop waveguide.

13. The light source according to claim 1, wherein the input waveguide and output waveguide are part of a same waveguide.

14. The light source according to claim 1, wherein the input waveguide and output waveguide are arranged on different and preferably opposite sides of the closed-loop waveguide.

15. A method for manufacturing the optical resonator according to claim 1, the method comprising:

providing a mono-crystalline aluminum oxide substrate;

depositing a monolithic silicon nitride film of at least 500 nm thick on the substrate in a single-step low-pressure chemical vapor deposition, LPCVD, process at a temperature between 750 and 950° C.;

providing a masking layer on top of the deposited silicon nitride film; patterning the masking layer; and etching the silicon nitride film using the patterned masking layer to thereby form at least the closed-loop waveguide, and preferably all, among the input waveguide, output waveguide, and closed-loop waveguide.

16. The method according to claim 15, wherein the deposited silicon nitride layer has a thickness of 750 nm or more.

17. The method according to claim 15, wherein the silicon nitride layer, $Si_XN_Y$, has a composition in which 0.71<=(X/Y)<=0.76.

18. The method according to claim 15, wherein the mono-crystalline aluminum oxide substrate comprises a sapphire substrate.

19. A microelectromechanical system (MEMS) optical switch, comprising:

a mono-crystalline aluminum oxide substrate;

a monolithic silicon nitride optical waveguide having a thickness of 500 nm or more, and which is deposited on the substrate, said optical waveguide comprising:

a base part deposited onto the substrate, wherein the first base is configured to receive a beam of light, and a suspended part having a first end at which the suspended part is integrally connected to the base part and a second end configured to emit said beam of light;

a light reception unit comprising an optical waveguide; and an actuator configured for displacing the second end relative to the light reception unit in response to an actuation signal to allow or prevent the light beam emitted by the second end to enter the optical waveguide of the light reception unit.

20. The MEMS optical switch according to claim 19, wherein the light reception unit comprises a plurality of optical waveguides, wherein the actuator is configured to, in response to the actuation signal, select one optical waveguide among the plurality of optical waveguides in which the light beam emitted by the second end is allowed to enter.

* * * * *